us009649010B2

(12) United States Patent
Oh

(10) Patent No.: US 9,649,010 B2
(45) Date of Patent: May 16, 2017

(54) DISH RACK

(71) Applicant: NATURNIC CO., LTD., Goyang-si, Gyeonggi-do (KR)

(72) Inventor: Dae-Woon Oh, Goyang-si (KR)

(73) Assignee: NATURNIC CO., LTD., Goyang-si, Gyeonggi-Do (KR)

( * ) Notice: Subject to any disclaimer, the term of this patent is extended or adjusted under 35 U.S.C. 154(b) by 0 days.

(21) Appl. No.: 14/888,569

(22) PCT Filed: Oct. 22, 2014

(86) PCT No.: PCT/KR2014/009981
§ 371 (c)(1),
(2) Date: Nov. 2, 2015

(87) PCT Pub. No.: WO2016/056695
PCT Pub. Date: Apr. 14, 2016

(65) Prior Publication Data
US 2016/0249783 A1 Sep. 1, 2016

(30) Foreign Application Priority Data

Oct. 7, 2014 (KR) ........................ 10-2014-0135297

(51) Int. Cl.
A47L 19/04 (2006.01)
A47J 47/16 (2006.01)
A47J 47/20 (2006.01)

(52) U.S. Cl.
CPC ............... A47L 19/04 (2013.01); A47J 47/16 (2013.01); A47J 47/20 (2013.01)

(58) Field of Classification Search
CPC . A47L 19/00; A47L 19/04; A47J 47/16; A47J 47/20
(Continued)

(56) References Cited

U.S. PATENT DOCUMENTS 2,443,404 A * 6/1948 Tallarico ................. A47L 19/02
211/41.4
2,901,120 A * 8/1959 Abrahamson ............. B42F 7/12
211/126.12
(Continued)

FOREIGN PATENT DOCUMENTS

FR 1231123 A * 9/1960 ............. A47L 19/04
FR 2109651 A7 * 5/1972 ............. A47L 19/04
(Continued)

Primary Examiner — Stanton L Krycinski
(74) Attorney, Agent, or Firm — Novick, Kim & Lee, PLLC; Jae Youn Kim

(57) ABSTRACT

The present invention relates to a dish rack that includes: a lower rack that has a drain hole formed in the bottom thereof and receives a dish therein; an upper rack that is provided above the lower rack at a different height and receives a dish therein; and a support frame coupled to the lower and upper racks to maintain the lower and upper racks spaced apart from each other, wherein the lower and upper racks and the support frame are assembled to each other through coupling bosses and coupling holes that are formed therein to correspond to each other. In the present invention, the upper and lower racks and the support frame of the dish rack can be assembled to each other in an easy and simple manner through the coupling bosses and the coupling holes without a separate fastener, thereby enhancing assembly efficiency of the dish rack.

13 Claims, 8 Drawing Sheets

(58) Field of Classification Search
USPC .................................................... 211/126.2
See application file for complete search history.

(56) References Cited

U.S. PATENT DOCUMENTS

| | | | | |
|---|---|---|---|---|
| 3,393,808 | A * | 7/1968 | Chirchill | A47F 1/087 193/27 |
| 3,757,705 | A * | 9/1973 | Maslow | A47B 57/265 108/147.13 |
| 4,074,810 | A * | 2/1978 | Juergens | B42F 7/12 211/11 |
| D249,048 | S * | 8/1978 | Drell | D19/92 |
| 4,105,126 | A * | 8/1978 | Deffner | A47F 1/12 211/59.2 |
| 4,356,923 | A * | 11/1982 | Young | A47F 7/28 211/184 |
| 4,428,487 | A * | 1/1984 | Hepp | A47B 87/0246 108/180 |
| 4,474,297 | A * | 10/1984 | Zucker | A47F 1/12 211/184 |
| 4,598,828 | A * | 7/1986 | Young | A47F 1/12 211/59.2 |
| 4,635,563 | A * | 1/1987 | Hand | A47B 96/024 108/107 |
| 4,734,001 | A * | 3/1988 | Bennett | F16B 39/10 411/119 |
| 4,785,939 | A * | 11/1988 | Huerto | B42F 7/12 108/190 |
| 4,852,749 | A * | 8/1989 | Fernandez | A47J 36/2405 211/126.2 |
| 4,901,872 | A * | 2/1990 | Lang | A47B 87/0223 108/91 |
| 4,981,224 | A * | 1/1991 | Rushing | A47B 87/0223 211/126.12 |
| 5,054,629 | A * | 10/1991 | Breen | B42F 7/12 211/126.12 |
| 5,299,690 | A * | 4/1994 | Mund | B42F 7/12 206/503 |
| 5,718,343 | A * | 2/1998 | Belokin | A47B 47/00 211/118 |
| 5,988,410 | A * | 11/1999 | Mandle | A47F 5/0037 211/126.15 |
| 6,491,170 | B1 * | 12/2002 | Madela | A47L 19/04 211/41.3 |
| D522,061 | S * | 5/2006 | Chen | D19/92 |
| D523,088 | S * | 6/2006 | Chien | D19/92 |
| D555,310 | S * | 11/2007 | Yang | D32/55 |
| D555,311 | S * | 11/2007 | Yang | D32/55 |
| 7,325,695 | B2 * | 2/2008 | Yang | A47F 1/12 211/41.2 |
| 7,407,059 | B2 * | 8/2008 | Sullivan | A47L 19/04 211/41.3 |
| 7,669,721 | B2 * | 3/2010 | Kemper | A47L 19/04 211/126.1 |
| 7,748,543 | B2 * | 7/2010 | Yang | A47L 19/04 211/41.3 |
| 7,762,410 | B2 * | 7/2010 | Colin | A47B 57/20 108/107 |
| 7,766,174 | B2 * | 8/2010 | Abraitis | A47B 61/04 211/36 |
| D646,450 | S * | 10/2011 | Yang | D32/55 |
| 8,074,813 | B2 * | 12/2011 | Yang | A47L 19/04 211/41.3 |
| 9,332,865 | B1 * | 5/2016 | Mason | A47F 5/10 |
| 2004/0099617 | A1 * | 5/2004 | Elias | A47L 19/04 211/41.3 |
| 2008/0006401 | A1 * | 1/2008 | Buytaert | E21B 17/10 166/77.51 |
| 2009/0211994 | A1 * | 8/2009 | Yang | A47L 19/04 211/41.4 |
| 2015/0197926 | A1 * | 7/2015 | Jones | A47J 47/20 4/658 |

FOREIGN PATENT DOCUMENTS

| | | | |
|---|---|---|---|
| GB | 1173135 A | * 12/1969 | ............ A47L 19/04 |
| KR | 20-1990-0002537 U | 2/1990 | |
| KR | 10-2005-0023580 A | 3/2005 | |
| KR | 10-2009-0034050 A | 4/2009 | |
| KR | 20-2009-0003801 U | 4/2009 | |

* cited by examiner

DISH RACK

BACKGROUND OF THE INVENTION

1. Field of the Invention

The present invention relates to a dish rack. More specifically, the present invention relates to a prefabricated dish rack that has a plurality of drying trays stacked one above another.

2. Description of the Prior Art

In general, dish racks are placed in the kitchen in order to store various types of dishes, such as washed bowls, cups, plates, etc., and to dry them. Such dish racks may be used to evenly arrange and store a plurality of dishes, thereby making it possible to efficiently use the narrow space of the kitchen.

The dish racks include a plurality of trays at different heights to receive a plurality of dishes. In this case, storage and transport costs increase due to an increase in the total volume of the dish racks.

In order to solve the problem, prefabricated dish racks in which users assemble a plurality of components that are delivered in a separated state have been developed. However, such prefabricated dish racks are less durable than integrated type dish racks, and assembly efficiency of the prefabricated dish racks is deteriorated because fasteners, such as bolts, are required.

SUMMARY OF THE INVENTION

The present invention has been conceived to solve such problems in the art, and an aspect of the present invention is to provide a dish rack having a plurality of drying trays stacked one above another that can be easily assembled.

Another aspect of the present invention is to provide a dish rack in which components cannot be easily disassembled or clearances therebetween cannot be easily generated by an external force while the dish rack is assembled without a separate fastener.

For this purpose, an exemplary embodiment of the present invention provides a dish rack that includes: a lower rack that has a drain hole formed in the bottom thereof and receives a dish therein; an upper rack that is provided above the lower rack at a different height and receives a dish therein; and a support frame coupled to the lower and upper racks to maintain the lower and upper racks spaced apart from each other, wherein the lower and upper racks and the support frame are assembled to each other through coupling bosses and coupling holes that are formed therein to correspond to each other.

Each of the coupling bosses may include a body and a head protruding from one end of the body, and each of the coupling holes may include an introduction portion that corresponds to the head and a mounting portion that is connected to the introduction portion and corresponds to the body of the coupling boss.

The support frame may have a lower coupling hole to which the coupling boss of the lower rack is coupled and an upper coupling hole to which the coupling boss of the upper rack is coupled, and the lower and upper coupling holes may be formed such that introduction portions and mounting portions thereof extend in different directions.

An inclined boss surface may be formed on the outer peripheral surface of the body of the coupling boss such that the body of the coupling boss has an increasing cross-sectional area toward the head, and an inclined hole surface may be formed on the inner peripheral surface of the coupling hole to correspond to the inclined boss surface.

A stopper may be formed between the introduction portion and the mounting portion of the coupling hole to protrude in a direction in which the width of the coupling hole is reduced, and the width of the coupling hole that has the stopper formed therein may be smaller than the thickness of the body of the coupling boss.

The introduction portion of the coupling hole may be formed to be larger than or equal to the head of the coupling boss, and the mounting portion of the coupling hole may be formed to be smaller than or equal to the body of the coupling boss.

A pair of support frames may be coupled to opposite sides of the lower and upper racks, respectively, and a rear frame may be provided on the rear surfaces of the lower and upper racks.

The upper end of at least one of the support frames and the rear frame may further protrude upward beyond the upper end of the upper rack.

The lower rack may have a larger area than the upper rack and may further protrude to a side beyond the upper rack, and the support frame may have an inclined portion formed on a side thereof in which to connect the protruding portion of the lower rack and the upper rack.

Lower and upper metal trays may be provided on the lower and upper racks, respectively.

A waterspout, one end of which is connected to the drain hole, may be provided on the bottom surface of the lower rack.

While the coupling bosses are inserted into the coupling holes, fixing clips may be coupled to the coupling bosses to maintain the coupling state between the coupling bosses and the coupling holes.

A clip groove may be concavely formed on the side surface of each coupling boss, and the fixing clips may be inserted into the clip grooves to be brought close to the edges of the coupling holes while the coupling bosses are inserted into the coupling holes.

Each fixing clip may have an opening portion formed therein which is open at one side thereof, and a stopping boss that engages with the clip groove may be formed on the inside of the opening portion.

The heights of the coupling bosses that protrude from the outer surfaces of the lower and upper racks to the clip grooves of the coupling bosses may correspond to the thickness of the support frame.

The dish rack according to the embodiments of the present invention has the following advantages.

The upper and lower racks and the support frame of the dish rack can be assembled to each other in an easy and simple manner through the coupling bosses and the coupling holes without a separate fastener, thereby enhancing assembly efficiency of the dish rack.

Further, since the coupling bosses move along the coupling holes, it is possible to prevent the coupling bosses from being separated from the coupling holes, and in particular, the coupling hole to which the upper rack is coupled and the coupling hole to which the lower rack is coupled extend in different directions so that it is possible to prevent the dish rack from being disassembled even though external forces are applied thereto in diverse directions, thereby enhancing assembly durability.

In addition, since the coupling holes and the coupling bosses have the inclined surfaces that correspond to each other, the upper and lower racks and the support frame can be naturally induced to be brought close to each other in the assembly process, thereby preventing clearances between the components constituting the dish rack and thus enhancing assembly durability of the dish rack and preventing noise caused by the clearances.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE EXEMPLARY EMBODIMENTS

Figure 1:
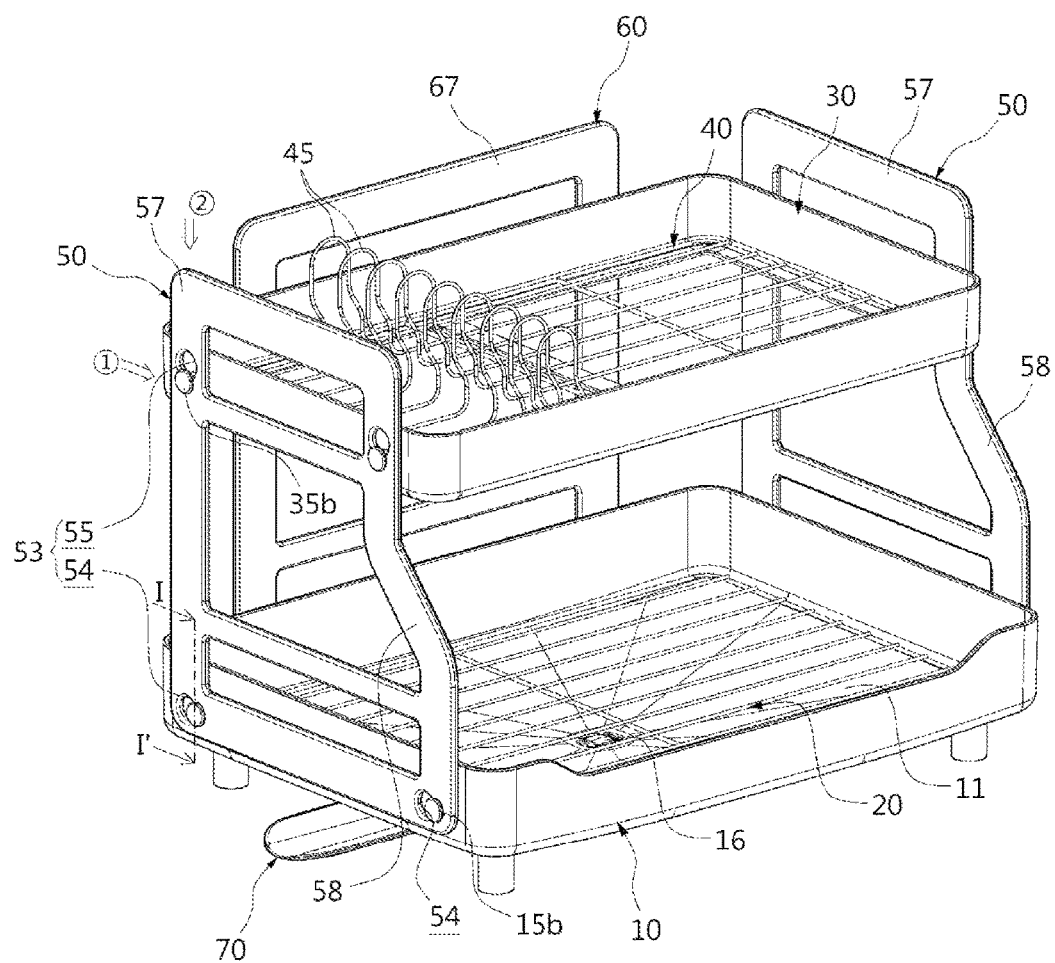
FIG. 1 is a perspective view of a dish rack according to an exemplary embodiment of the present invention.

Hereinafter, exemplary embodiments of the present invention will be described in detail with reference to the accompanying drawings. In the following description, the same components will be designated by the same reference numerals although they are shown in different drawings. In the description of the embodiments of the present invention, detailed descriptions related to well-known configurations or functions will be omitted when it is determined that they may make the embodiments of the present invention obscure.

Furthermore, in the description of the structural element of the present invention, terms of "first", "second", "A", "B", "(a)", "(b)" and the like may be used. These terms are merely used to distinguish one structural element from other structural elements, and a property, an order, a sequence and the like of a corresponding structural element are not limited by the term. If a component is described as 'connected', 'coupled', or 'linked' to another component, one of ordinary skill in the art would understand the components are not necessarily directly 'connected', 'coupled', or 'linked' but also are indirectly 'connected', 'coupled', or 'linked' via a third component.

Figure 2:
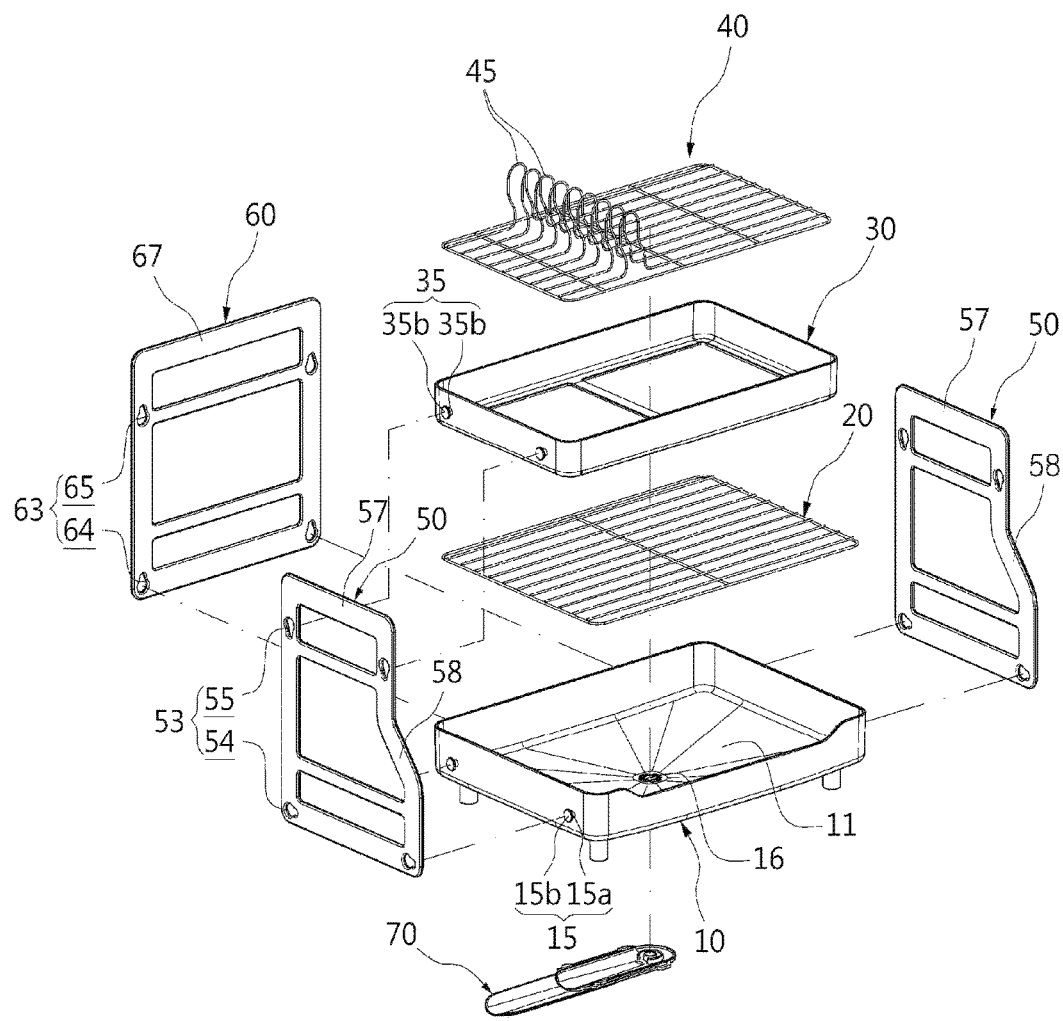
FIG. 2 is an exploded perspective view of the dish rack according to the exemplary embodiment of the present invention.
Figure 3:
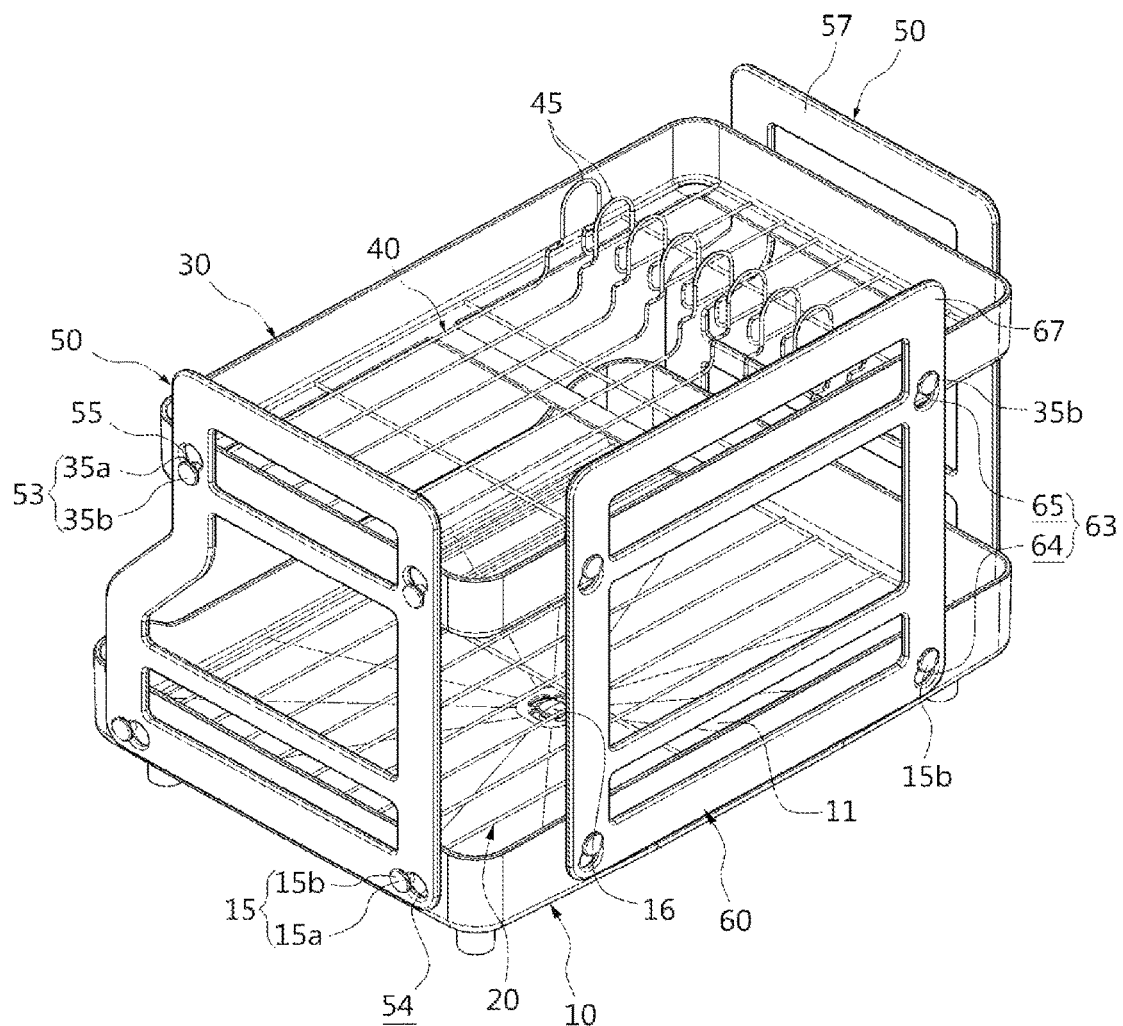
FIG. 3 is a rear perspective view of the dish rack according to the exemplary embodiment of the present invention.

FIG. 1 is a perspective view of a dish rack according to an exemplary embodiment of the present invention, FIG. 2 is an exploded perspective view of the dish rack according to the exemplary embodiment of the present invention, and FIG. 3 is a rear perspective view of the dish rack according to the exemplary embodiment of the present invention.

As illustrated in the drawings, the dish rack, according to the present invention, includes a lower rack 10 and an upper rack 30 at different heights and thus can receive and dry a larger number of dishes than a dish rack that has a single-story structure. The dish rack, according to the present invention, is implemented in a prefabricated type rather than an integrated type. Hereinafter, configurations of the dish rack and a coupling method thereof will be sequentially described.

The lower rack 10 has a receiving space formed therein for receiving dishes and a drain hole 16 formed in the bottom 11 thereof. The bottom 11 of the lower rack 10 is formed to be downwardly inclined toward the drain hole 16 so that water flowing down the dishes may be guided to the drain hole 16 and drained to the outside therethrough. Of course, the lower rack 10 may also be formed in a structure in which the bottom thereof is perforated without the separate drain hole 16.

The lower rack 10 has coupling bosses (hereinafter, referred to as 'lower coupling bosses 15'). The lower coupling bosses 15 protrude from the outer surface of the lower rack 10 and are coupled to lower coupling holes 54 among coupling holes 53 of support frames 50, which will be described below.

More specifically, each of the lower coupling bosses 15 includes a body 15a and a head 15b protruding from one end of the body 15a. The head 15b has a larger cross-sectional area than the body 15a to prevent the lower coupling boss 15 from being separated from the corresponding coupling hole 53 after being coupled thereto. The body 15a has the shape of a cylinder in this embodiment. However, the body 15a may also have a polygonal cross section without being limited thereto.

A plurality of lower coupling bosses 15 are formed on the outer surface of the lower rack 10. In this embodiment, a total of six lower coupling bosses 15 are formed to couple a pair of support frames 50 and a rear frame 60, which will be described below.

The lower rack 10 includes a lower tray 20. The lower tray 20 is mounted in the receiving space of the lower rack 10 to substantially store dishes to be dried, and is formed in a thin metal net structure as illustrated in FIGS. 1 and 2.

The upper rack 30 is provided above the lower rack 10. Likewise to the lower rack 10, the upper rack 30 may have a receiving space formed therein for receiving dishes and may be formed in a structure in which the bottom thereof is perforated as illustrated in FIG. 1.

Likewise to the lower rack 10, the upper rack 30 includes coupling bosses (hereinafter, referred to as 'upper coupling bosses 35') that have the same structure as the lower coupling bosses 15. A plurality of upper coupling bosses 35 also protrude from the outer surface of the upper rack 30 and are coupled to upper coupling holes 55 among the coupling holes 53 of the support frames 50, which will be described below.

The upper rack 30 includes an upper tray 40. The upper tray 40 is mounted in the receiving space of the upper rack 30 to store dishes to be dried, and is formed in a thin metal net structure likewise to the lower tray 20. The upper tray 40 may also include a plate receiving portion 45 where dishes, such as plates, can be vertically stored.

Meanwhile, in this embodiment, the lower rack 10 has a larger area than the upper rack 30 and thus further protrudes to a side beyond the upper rack 30. Accordingly, as illustrated in FIG. 1, a space between the lower and upper racks 10 and 30, that is, an entrance that dishes pass through so as to be received in the receiving space of the lower rack 10 is obliquely formed in the diagonal direction, thereby making it possible for a user to store dishes in the lower receiving space or to remove the dishes therefrom in a more convenient manner. Of course, the lower rack 10 may also have the same size as the upper rack 30.

The support frames 50 are coupled to the lower and upper racks 10 and 30. The support frames 50 function to maintain the lower and upper racks 10 and 30 spaced apart from each other. The support frames 50 may be formed of a metal or synthetic resin material and may have the shape of a thin plate.

The support frames 50 have the coupling holes 53 formed therein. The upper coupling bosses 35 and the lower coupling bosses 15 are inserted into and coupled to the coupling holes 53. To this end, the coupling holes 53 also include the upper coupling holes 55 and the lower coupling holes 54. The upper coupling holes 55 have the same shape as the lower coupling holes 54, and the lower coupling holes 54 will be described below as an example.

Figure 4:
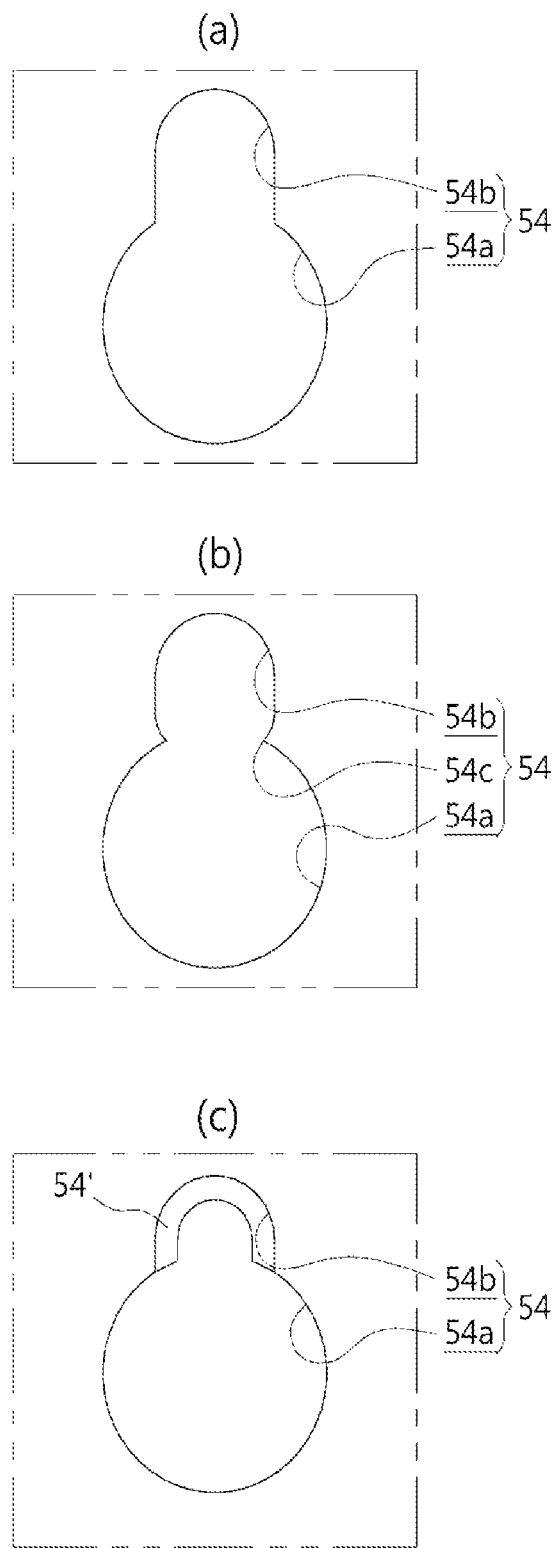
FIGS. 4A to 4C are front views illustrating examples of a coupling hole formed in a support frame constituting the present invention.

As illustrated in FIG. 4A, each of the lower coupling holes 54 includes an introduction portion 54a that corresponds to the head 15b of the corresponding lower coupling boss 15 and a mounting portion 54b that is connected to the introduction portion 54a and corresponds to the body 15a of the lower coupling boss 15. The introduction portion 54a and the mounting portion 54b have a structure in which the lower coupling boss 15 is prevented from being separated from the lower coupling hole 54 when the lower coupling boss 15 is inserted through the introduction portion 54a and moved to the mounting portion 54b.

To this end, the introduction portion 54a of the lower coupling hole 54 may be formed to be larger than or equal to the head 15b of the lower coupling boss 15 so that the head 15b of the lower coupling boss 15 can be inserted into the introduction portion 54a. Further, the mounting portion 54b of the lower coupling hole 54 may be formed to be smaller than the head 15b and to be smaller than or equal to the body 15a of the lower coupling boss 15 at the same time so that the head 15b cannot escape from the mounting portion 54b, and the body 15a of the lower coupling boss 15 can be firmly fixed to the mounting portion 54b.

Meanwhile, the lower coupling holes 54 to which the lower coupling bosses 15 of the lower rack 10 are coupled and the upper coupling holes 55 to which the upper coupling bosses 35 of the upper rack 30 are coupled are formed such that the introduction portions 54a, 55a and the mounting portions 54b, 55b thereof are connected in different directions. That is, the lower coupling holes 54 and the upper coupling holes 55, which are formed in the support frames 50, extend in different directions. As illustrated in FIG. 2, in this embodiment, the lower coupling holes 54 extend leftward and rightward and the upper coupling holes 55 extend upward and downward with respect to the drawing.

Due to this structure, the direction in which the lower coupling bosses 15 are coupled to the lower coupling holes 54 is perpendicular to the direction in which the upper coupling bosses 35 are coupled to the upper coupling holes 55. Therefore, even though external forces are applied to the dish rack, according to the present invention, in diverse directions, the upper and lower racks 10 and 30 can be prevented from being separated from the support frames 50. More specifically, when an external force is applied in the direction of an arrow ① of FIG. 1, the direction of the external force is perpendicular to the direction in which the upper coupling bosses 35 are coupled to the upper coupling holes 55 so that the upper coupling bosses 35 are prevented from being separated from the upper coupling holes 55. Further, when an external force is applied in the direction of an arrow ② of FIG. 1, the direction of the external force is perpendicular to the direction in which the lower coupling bosses 15 are coupled to the lower coupling holes 54 so that the lower coupling bosses 15 are prevented from being separated from the lower coupling holes 54.

Each of the support frames 50 has an inclined portion 58 formed on a side thereof in which to connect the relatively further protruding portion of the lower rack 10 and the upper rack 30.

Meanwhile, the rear frame 60 is coupled to the rear surfaces of the lower and upper racks 10 and 30. The rear frame 60 is positioned between the pair of support frames 50 to connect the lower and upper racks 10 and 30.

The rear frame 60 has assembly holes 63 formed therein in which to perform the same function as the coupling holes 53 of the support frames 50. The rear frame 60 has a plurality of assembly holes 63 to which the lower coupling bosses 15 of the lower rack 10 and the upper coupling bosses 35 of the upper rack 30 are coupled, respectively.

The upper end 57 or 67 of at least one of the support frames 50 and the rear frame 60 preferably further protrudes upward beyond the upper end of the upper rack 30. The reason is to more safely receive dishes in the upper rack 30 and to allow the protruding upper end portion 57 or 67 to function as a kind of handle.

Meanwhile, FIG. 4B illustrates another example of the lower coupling hole 54. As illustrated in FIG. 4B, stoppers 54C are formed between the introduction portion 54a and the mounting portion 54b of the lower coupling hole 54 to protrude in the direction in which the width of the lower coupling hole 54 is reduced. Since the width of the lower coupling hole 54 that has the stoppers 54C formed thereon is smaller than that of the body 15a of the lower coupling boss 15, the lower coupling boss 15, while moving along the lower coupling hole 54, resiliently deforms the lower coupling hole 54 in the direction in which the width of the lower coupling hole 54 is increased, and is thereafter mounted on the mounting portion 54b of the lower coupling hole 54 so that the lower coupling boss 15 can be prevented from arbitrarily moving toward the introduction portion 54a. Furthermore, through the resilient deformation and restoration in the process in which the lower coupling boss 15 passes through the stoppers 54c, a user can recognize that the lower coupling boss 15 is completely assembled in the lower coupling hole 54.

In addition, FIG. 4C illustrates yet another example of the lower coupling hole 54. As illustrated in FIG. 4C, an inclined hole surface 54' is obliquely formed on the mounting portion 54b of the lower coupling hole 54. The inclined hole surface 54' corresponds to an inclined boss surface 15' of the lower coupling boss 15.

Figure 5:
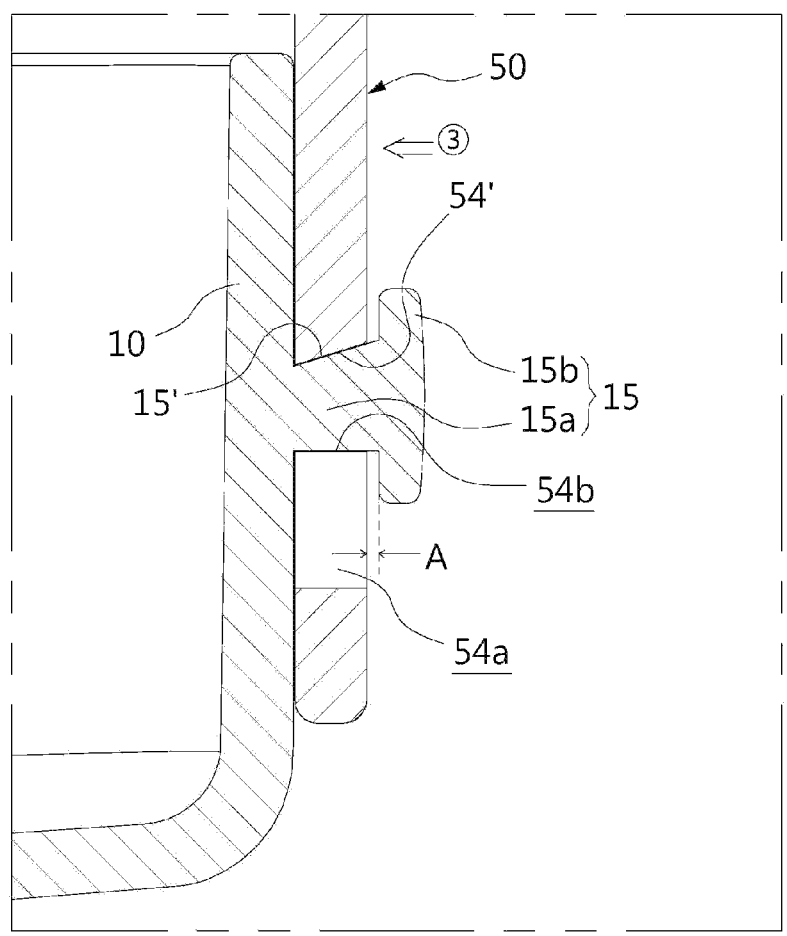
FIG. 5 is a sectional view taken along line I-I' of FIG. 1.

More specifically, as illustrated in FIG. 5, the inclined boss surface 15' is obliquely formed on the outer peripheral surface of the body 15a of the lower coupling boss 15 such that the body 15a of the lower coupling boss 15 has an increasing cross-sectional area toward the head 15b thereof, and the inclined hole surface 54' is formed on the inner peripheral surface of the lower coupling hole 54 to correspond to the inclined boss surface 15'.

Accordingly, as the lower coupling boss 15 moves toward the mounting portion 54b of the lower coupling hole 54, the corresponding support frame 50 may be brought closer to the lower rack 10 (in the direction of an arrow ③ of FIG. 5). Consequently, noise caused by a clearance can be prevented because the support frame 50 and the lower rack 10 are brought close to each other. In addition, even though there is a clearance A between the head 15b of the lower coupling boss 15 and the outer surface of the support frame 50 to a certain extent for the enhancement of assembly efficiency, the coupling between the support frame 50 and the lower rack 10 can be firmly maintained. Of course, the above-described structure may also be identically applied to the upper coupling bosses 35 and the upper coupling holes 55.

Meanwhile, a waterspout 70 is assembled to the bottom surface of the lower rack 10. The waterspout 70 is disposed on the lower side of the lower rack 10 to correspond to the drain hole 16 thereof and drains, to the outside, water that is introduced through the drain hole 16.

Hereinafter, an operation of the dish rack, according to the present invention, which has the above-described structure, will be described in detail.

First, a process of assembling the dish rack, according to the present invention, will be described. For the assembly of the dish rack, the support frames 50 are coupled to the opposite lateral sides of the lower rack 10. More specifically, the lower rack 10 and the support frames 50 are coupled to each other by inserting the lower coupling bosses 15 of the lower rack 10 into the lower coupling holes 54 of the support frames 50.

Figure 6:
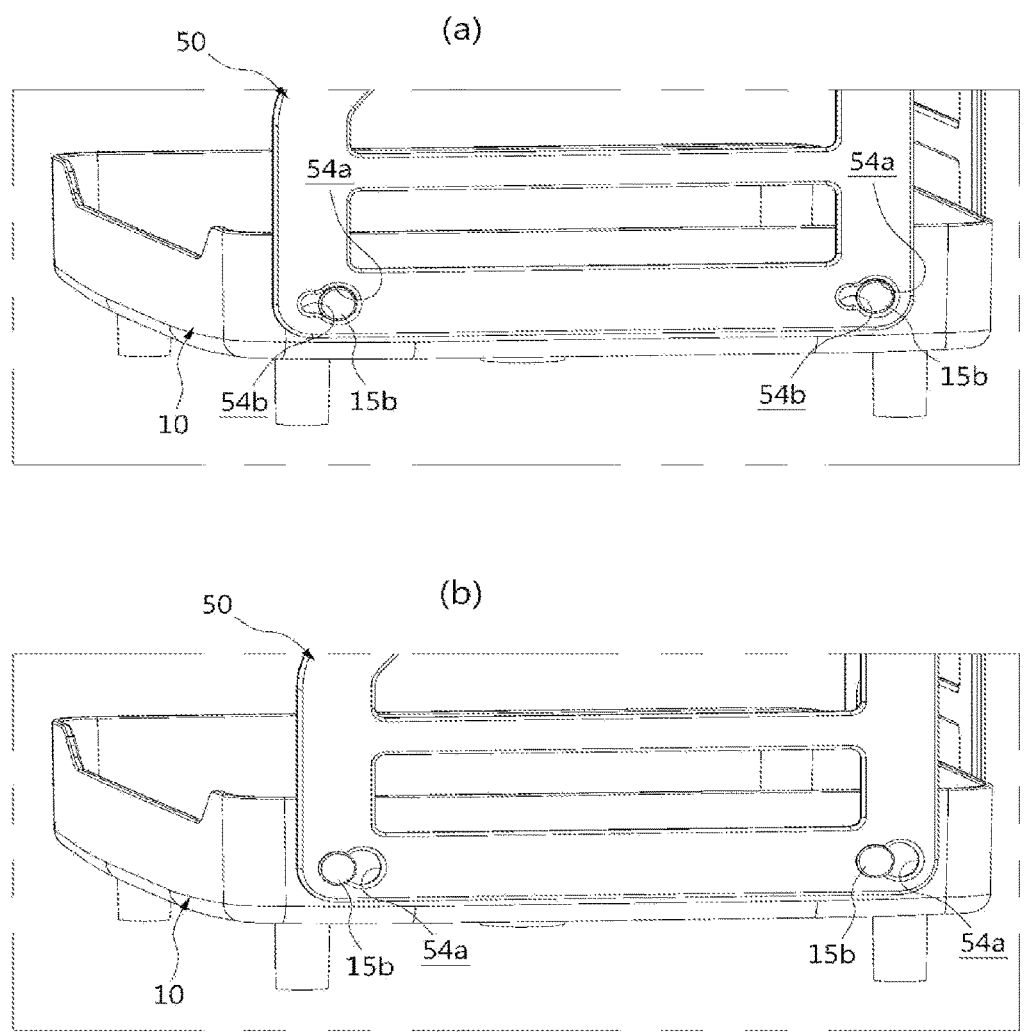
FIGS. 6A and 6B are views sequentially illustrating a process of assembling a lower rack and support frames that constitute the present invention.

FIGS. 6A and 6B are views sequentially illustrating the assembly process. As illustrated in the drawings, the support frames 50 and the lower rack 10 are brought close to each other by passing the heads 15b of the lower coupling bosses 15 through the introduction portions 54a of the lower coupling holes 54 of the support frames 50. Since the introduction portions 54a are larger than or equal to the heads 15b, the heads 15b can pass through the introduction portions 54a (FIG. 6A).

When the support frames 50 move relative to the lower rack 10 in this state, the lower coupling bosses 15 move along the lower coupling holes 54 so that the bodies 15a of the lower coupling bosses 15 are mounted on the mounting portions 54b of the lower coupling holes 54 (FIG. 6B).

Since the heads 15b cannot be separated from the mounting portions 54b in this state, the support frames 50 can be maintained in the assembled state without being separated in the direction away from the lower rack 10.

In this case, as the lower coupling bosses 15 move toward the mounting portions 54b of the lower coupling holes 54 in the assembly process, the support frames 50 and the lower rack 10 may be brought closer to each other (in the direction of the arrow ③ of FIG. 5), thereby preventing noise caused by a clearance between components while the dish rack is used.

Next, the upper rack 30 is assembled to the upper portions of the support frames 50. The upper coupling bosses 35 of the upper rack 30 are coupled to the upper coupling holes 55 of the support frames 50. The upper coupling bosses 35 move from the introduction portions to the mounting portions of the upper coupling holes 55 so that the upper rack 30 is assembled to the support frames 50 in the same way that the support frames 50 and the lower rack 10 are coupled to each other.

However, the direction in which the upper rack 30 is assembled to the support frames 50 is perpendicular to that in which the lower rack 10 is assembled to the support frames 50. This is because the lower coupling holes 54 and the upper coupling holes 55 of the support frames 50 extend in the mutually perpendicular directions.

Then, the rear frame 60 is coupled to the rear surfaces of the lower and upper racks 10 and 30. The lower coupling bosses 15 and the upper coupling bosses 35 are inserted into the assembly holes 63 of the rear frame 60 so that the rear frame 60 is assembled to the lower and upper racks 10 and 30.

Further, the lower and upper trays 20 and 40 are seated on the lower and upper racks 10 and 30, respectively, and the waterspout 70 is assembled to the bottom surface of the lower rack 10. The waterspout 70 is assembled, at one end thereof, to the location that corresponds to the drain hole 16 of the lower rack 10 to discharge drained water to the outside.

A plurality of dishes may be received in the dish rack, which is assembled as described above, and may be dried therein. That is, water on the dishes falls onto the lower portion of the dish rack and is drained to the outside through the drain hole 16. More specifically, water on the dishes received in the upper rack 30 falls onto the lower rack 10, and water on the dishes received in the lower rack 10 is guided to the drain hole 16 and discharged to the outside through the waterspout 70.

Meanwhile, in the dish rack according to the present invention, the direction in which the lower coupling bosses 15 are coupled to the lower coupling holes 54 is perpendicular to the direction in which the upper coupling bosses 35 are coupled to the upper coupling holes 55. Therefore, even though external forces are applied to the dish rack in diverse directions while the dish rack is used, the upper and lower racks 10 and 30 can be prevented from being separated from the support frames 50.

Figure 7:
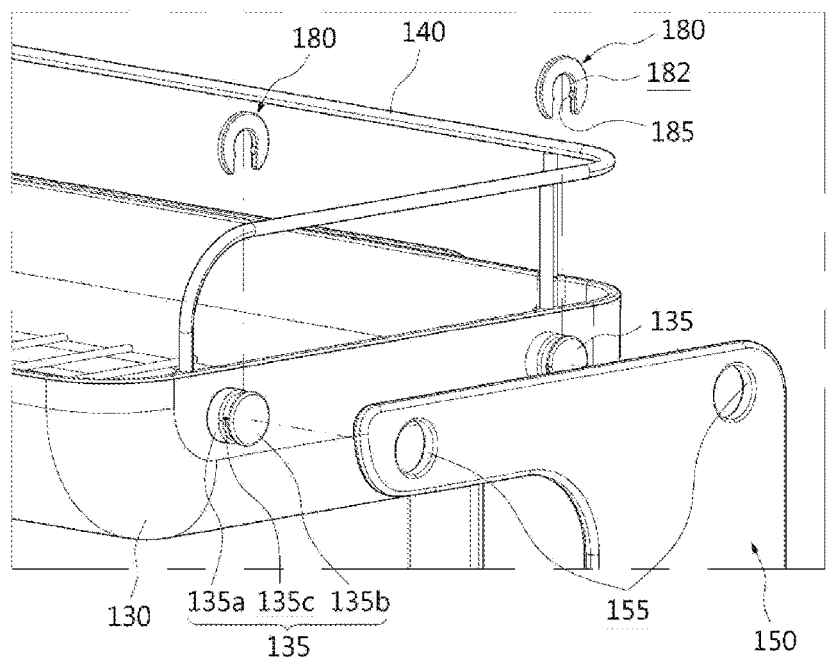
FIGS. 7 to 9 are views sequentially illustrating a process of assembling a dish rack according to another embodiment of the present invention.
Figure 8:
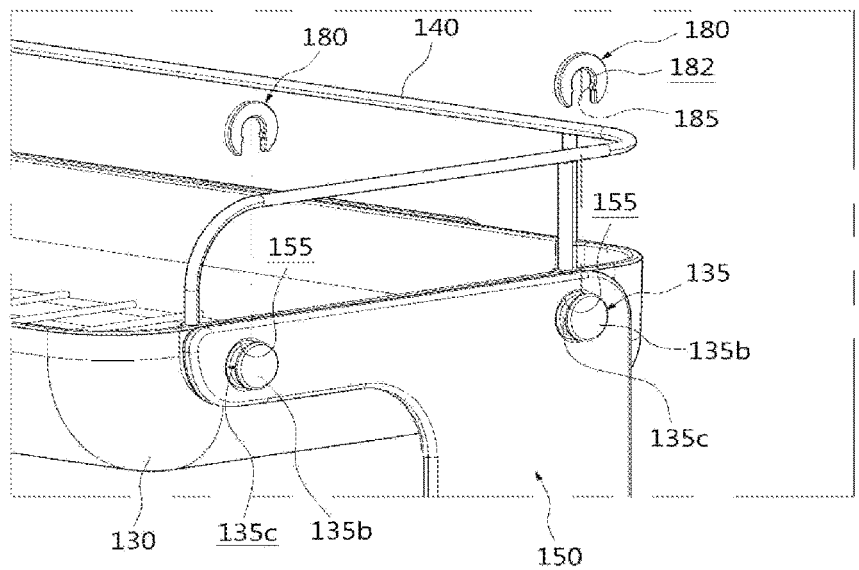
Figure 9:
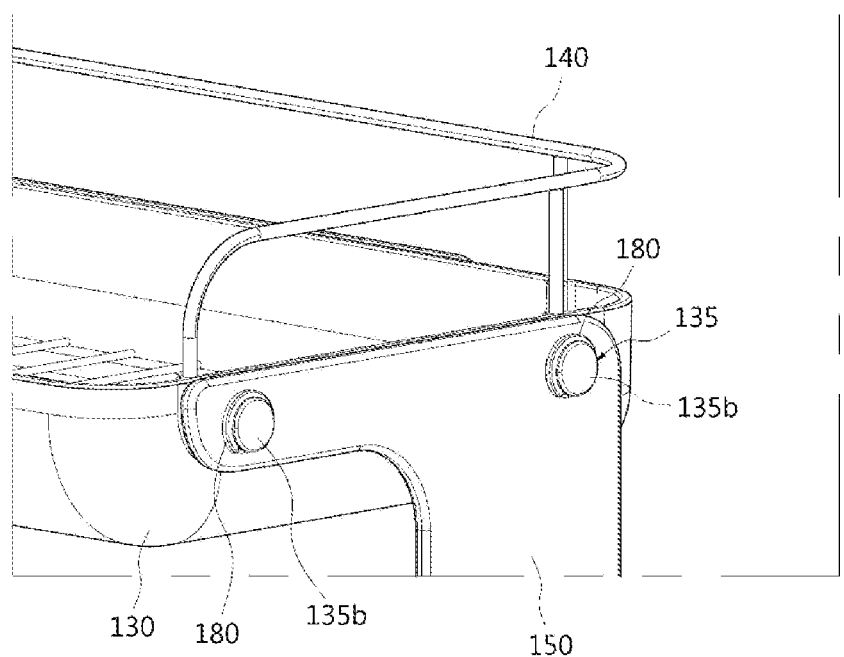

FIGS. 7 to 9 are views sequentially illustrating a process of assembling a dish rack according to another embodiment of the present invention. Hereinafter, descriptions of the same elements as those in the preceding embodiment will be omitted, and the following description will be focused on distinguishing elements.

As illustrated in the drawings, a lower rack and an upper rack 130 of the dish rack of the present invention are coupled to the support frames 150 so that the lower and upper racks are connected to each other. In this case, coupling bosses 135 are formed on the lower rack and the upper rack 130, and coupling holes 155 are formed in the support frames 150. The coupling bosses 135 correspond to the coupling holes 155, respectively.

The coupling bosses 135 protrude from the outer surface of the upper rack 130, each of which includes a boss body 135a connected to the outer surface of the upper rack 130 and a boss head 135b. The boss head 135b is formed on the outermost portion of the boss body 135a.

Further, a clip groove 135c is formed between the boss body 135a and the boss head 135b. The clip groove 135c is a portion to which a fixing clip 180, which will be described below, is coupled, and is concavely formed on the outer surface of the coupling boss 135. Although not illustrated, a stopping groove is more concavely formed on the inner surface of the clip groove 135c, and a stopping boss 185 of the fixing clip 180, which will be described below, may engage with the stopping groove.

The fixing clip 180 is coupled to the clip groove 135c of the coupling boss 135. As illustrated in FIG. 7, the fixing clip 180 is formed in the shape of a thin plate that is open at one side thereof. That is, the fixing clip 180 is inserted into the clip groove 135c of the coupling boss 135 through an opening portion 182 and is preferably formed to have a shape that corresponds to the coupling boss 135.

As illustrated in FIG. 9, the fixing clip 180 is inserted into the clip groove 135c so as to be brought close to the edge of the coupling hole 155 of the support frame 150, thereby maintaining the coupling state between the coupling boss 135 and the coupling hole 155. To this end, the fixing clip 180 has to be formed to be larger than the coupling hole 155. Of course, the clip groove 135c may not be formed in the coupling boss 135, and the fixing clip 180 may be coupled to the outer peripheral surface of the coupling boss 135.

The fixing clip 180 has the opening portion 182 that is open at one side thereof, and the stopping boss 185 that engages with the clip groove 135c is formed on the inside of the opening portion 182. The stopping boss 185 is inserted into the stopping groove, which is concavely formed on the inside of the clip groove 135c, to prevent the fixing clip 180 from being separated from the clip groove 135c. Of course, the stopping groove may not be formed on the inside of the clip groove 135c, and the stopping boss 185 may be press-fit into the clip groove 135c.

Meanwhile, the height of the boss body 135a, more specifically, the distance from the outer surface of the upper rack 130 to the clip groove 135c preferably corresponds to the thickness of the support frame 150. The reason is to fix the support frame 150 between the outer surface of the upper rack 130 and the fixing clip 180 without a clearance while the fixing clip 180 is inserted into the clip groove 135c.

Hereinafter, a process of assembling the dish rack, according to the other embodiment of the present invention, will be described with reference to FIGS. 7 to 9. First, the support frames 150 are brought close to the lateral opposite sides of the upper rack 130. More specifically, the upper rack 130 and the support frames 150 are coupled to each other by inserting the coupling bosses 135 of the upper rack 130 into the upper coupling holes 155 of the support frames 150. This state is illustrated in FIG. 8.

In this state, the fixing clips 180 are inserted into the clip grooves 135c of the coupling bosses 135. More specifically, the opening portions 182 of the fixing clips 180 move toward the coupling bosses 135 and are inserted into the clip grooves 135c of the coupling bosses 135.

In this process, the fixing clips 180 may be resiliently deformed in the direction in which the widths of the opening portions 182 increase, and when the fixing clips 180 are completely inserted into the clip grooves, the fixing clips 180 may return to the original shapes thereof and may be firmly coupled to the clip grooves.

Accordingly, the fixing clips 180 support the edges of the coupling holes 155 of the support frames 150 to prevent the support frames 150 from being separated from the upper rack 130.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

Although the two-story dish rack constituted with the lower and upper racks 10 and 30 has been illustrated in the above description and the drawings, another rack may be additionally provided at a different height above the upper rack 30.

What is claimed is:

1. A dish rack comprising:
   a lower rack that has a drain hole formed in the bottom thereof and receives a dish therein;
   an upper rack that is provided above the lower rack at a different height and receives a dish therein; and
   a support frame coupled to the lower and upper racks to maintain the lower and upper racks spaced apart from each other,
   wherein the lower rack has a lower coupling boss, the upper rack has an upper coupling boss, and the support frame has a lower coupling hole coupled to the lower coupling boss and has an upper coupling hole coupled to the upper coupling boss,
   wherein each of the lower and upper coupling bosses comprises a body and a head protruding from one end of the body, and each of the lower and upper coupling holes comprises an introduction portion that corresponds to the head and a mounting portion that is connected to the introduction portion and corresponds to the body,
   wherein the lower and upper coupling holes are formed such that the introduction portion and mounting portion of the upper coupling hole extend in a perpendicular direction with respect to the introduction portion and mounting portion of the lower coupling hole, and thus a direction in which the upper rack is assembled to the support frame is perpendicular to that in which the lower rack is assembled to the support frame.

2. The dish rack of claim 1, wherein the body of each of the lower and upper coupling bosses has an inclined boss surface formed on an outer peripheral surface thereof such that the body of each of the lower and upper coupling bosses has an increasing cross-sectional area toward the head, and each of the lower and upper coupling holes has an inclined hole surface formed on an inner peripheral surface thereof to correspond to the inclined boss surface.

3. The dish rack of claim 1, wherein a stopper is formed between the introduction portion and the mounting portion of each of the lower and upper coupling holes to protrude in a direction in which a width of each of the lower and upper coupling holes is reduced, and the width of each of the lower and upper coupling holes that has the stopper formed therein is smaller than a thickness of the body of each of the lower and upper coupling bosses.

4. The dish rack of claim 1, wherein the introduction portion of each of the lower and upper coupling holes is formed to be larger than or equal to the head of each of the lower and upper coupling bosses, and the mounting portion of each of the lower and upper coupling holes is formed to be smaller than or equal to the body of each of the lower and upper coupling bosses.

5. The dish rack of claim 1, wherein the support frame comprises a left support frame and a right support frame coupled to opposite sides of the lower and upper racks, respectively, and a rear frame provided on rear surfaces of the lower and upper racks.

6. The dish rack of claim 5, wherein an upper end of at least one of the left and right support frames and the rear frame further protrudes upward beyond an upper end of the upper rack.

7. The dish rack of claim 1, wherein the lower rack has a larger area than the upper rack and further has a protruding portion protruding to a side beyond the upper rack, and the support frame has an inclined portion formed on a side thereof and connected to the protruding portion of the lower rack.

8. The dish rack of claim 1, wherein lower and upper metal trays are provided on the lower and upper racks, respectively.

9. The dish rack of claim 1, wherein a waterspout, one end of which is connected to the drain hole, is provided on a bottom surface of the lower rack.

10. The dish rack of claim 1, wherein while the lower and upper coupling bosses are inserted into the lower and upper coupling holes, fixing clips are each coupled to the lower and upper coupling bosses to maintain a coupling state between the lower and upper coupling bosses and the lower and upper coupling holes.

11. The dish rack of claim 10, wherein a clip groove is concavely formed on a side surface of each coupling boss, and the fixing clips are inserted into the clip grooves to be brought close to the edges of the lower and upper coupling holes while the lower and upper coupling bosses are inserted into the lower and upper coupling holes.

12. The dish rack of claim 11, wherein each fixing clip has an opening portion formed therein which is open at one side thereof, and a stopping boss that engages with the clip groove is formed on an inside of the opening portion.

13. The dish rack of claim 12, wherein the heights of the clip grooves of the lower and upper coupling bosses from the outer surfaces of the lower and upper racks correspond to a thickness of the support frame.

* * * * *